United States Patent
Evans

(10) Patent No.: US 9,555,381 B2
(45) Date of Patent: Jan. 31, 2017

(54) CONTAINER RESTRAINT ASSEMBLY

(71) Applicant: Daniel Evans, Uxbridge (CA)

(72) Inventor: Daniel Evans, Uxbridge (CA)

( * ) Notice: Subject to any disclaimer, the term of this patent is extended or adjusted under 35 U.S.C. 154(b) by 0 days.

(21) Appl. No.: 14/750,090

(22) Filed: Jun. 25, 2015

(65) Prior Publication Data

US 2016/0375414 A1 Dec. 29, 2016

(51) Int. Cl.
| | |
|---|---|
| *A47B 91/00* | (2006.01) |
| *A47G 29/00* | (2006.01) |
| *B65D 19/00* | (2006.01) |
| *B01F 11/00* | (2006.01) |
| *F16M 11/22* | (2006.01) |
| *F16M 11/04* | (2006.01) |

(52) U.S. Cl.
CPC ......... *B01F 11/0008* (2013.01); *F16M 11/041* (2013.01); *F16M 11/22* (2013.01)

(58) Field of Classification Search
CPC .. B01F 13/0016; B01F 13/0018; B01F 13/003
USPC .... 248/154, 500, 213.2, 346.01, 310, 316.8, 248/346.03, 346.04, 346.06, 346.07, 248/346.5; 220/628, 629, 630; 366/349, 366/129; 108/139, 142; 312/319.9
See application file for complete search history.

(56) References Cited

U.S. PATENT DOCUMENTS

| | | | | |
|---|---|---|---|---|
| 807,613 | A * | 12/1905 | Graves | B67B 7/18 248/346.07 |
| 2,689,701 | A * | 9/1954 | Whitaker | A47G 33/12 248/172 |
| 2,799,189 | A * | 7/1957 | Goodman, Sr. | A62C 13/76 269/239 |
| 2,896,293 | A * | 7/1959 | Love | E04H 12/32 24/494 |
| 3,301,103 | A * | 1/1967 | Shultz | B67B 7/14 81/3.32 |
| 4,515,195 | A * | 5/1985 | Gladstein | B27L 7/00 144/195.6 |
| 4,877,208 | A | 10/1989 | Kennard, Jr. | |
| 5,232,187 | A * | 8/1993 | O'Farrell | E04F 21/00 248/148 |
| 5,685,518 | A * | 11/1997 | Fox | A47G 33/1213 248/316.4 |
| 5,839,602 | A * | 11/1998 | Mowry | B44D 3/14 220/737 |
| 6,227,513 | B1 * | 5/2001 | Richard | A47G 7/025 211/43 |
| 6,464,184 | B1 | 10/2002 | Lytle | |
| 6,517,042 | B1 * | 2/2003 | Mlakar | A47G 33/1213 248/172 |
| 7,258,312 | B2 * | 8/2007 | Grosse | B01F 15/00733 248/154 |
| 7,261,262 | B2 | 8/2007 | Dunson | |

(Continued)

FOREIGN PATENT DOCUMENTS

WO WO2010081199 7/2010

*Primary Examiner* — Terrell McKinnon
*Assistant Examiner* — Michael McDuffie

(57) ABSTRACT

A container restraint assembly includes a base that may have a container positioned thereon. A stop is coupled to the base and the stop may engage the container. A retainer is movably coupled to the base wherein the retainer may be manipulated by a user. The retainer is positionable in an engaging position to compress the container against the stop. Thus, contents of the container may be mixed without the container tipping over. The retainer is positionable in a releasing position to allow the container to be removed from the base.

16 Claims, 6 Drawing Sheets

(56) References Cited

U.S. PATENT DOCUMENTS

| | | | |
|---|---|---|---|
| 7,494,097 B2 | 2/2009 | Lidie et al. | |
| 7,494,103 B1* | 2/2009 | Huebner | B01F 15/00733 248/310 |
| 7,708,242 B1 | 5/2010 | Petrashune et al. | |
| 8,033,417 B1 | 10/2011 | Fallacaro | |
| 8,641,005 B2 | 2/2014 | Cimaglio | |
| 8,746,636 B2 | 6/2014 | Rauchut | |
| 8,777,206 B1* | 7/2014 | Airosa | B44D 3/08 248/213.2 |
| 8,876,069 B2* | 11/2014 | Cimaglio | B01F 15/00746 248/122.1 |
| 2004/0084599 A1* | 5/2004 | Tedesco | E04F 21/00 248/500 |
| 2007/0076519 A1* | 4/2007 | Kesling | B01F 7/0045 366/129 |
| 2007/0280043 A1* | 12/2007 | Cintorino | B01F 15/00733 366/215 |
| 2008/0042035 A1* | 2/2008 | Elwood | B44D 3/14 248/346.03 |

* cited by examiner

CONTAINER RESTRAINT ASSEMBLY

BACKGROUND OF THE DISCLOSURE

Field of the Disclosure

The disclosure relates to restraint devices and more particularly pertains to a new restraint device for restraining a container while contents of the container are mixed.

SUMMARY OF THE DISCLOSURE

An embodiment of the disclosure meets the needs presented above by generally comprising a base that may have a container positioned thereon. A stop is coupled to the base and the stop may engage the container. A retainer is movably coupled to the base wherein the retainer may be manipulated by a user. The retainer is positionable in an engaging position to compress the container against the stop. Thus, contents of the container may be mixed without the container tipping over. The retainer is positionable in a releasing position wh to allow the container to be removed from the base.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
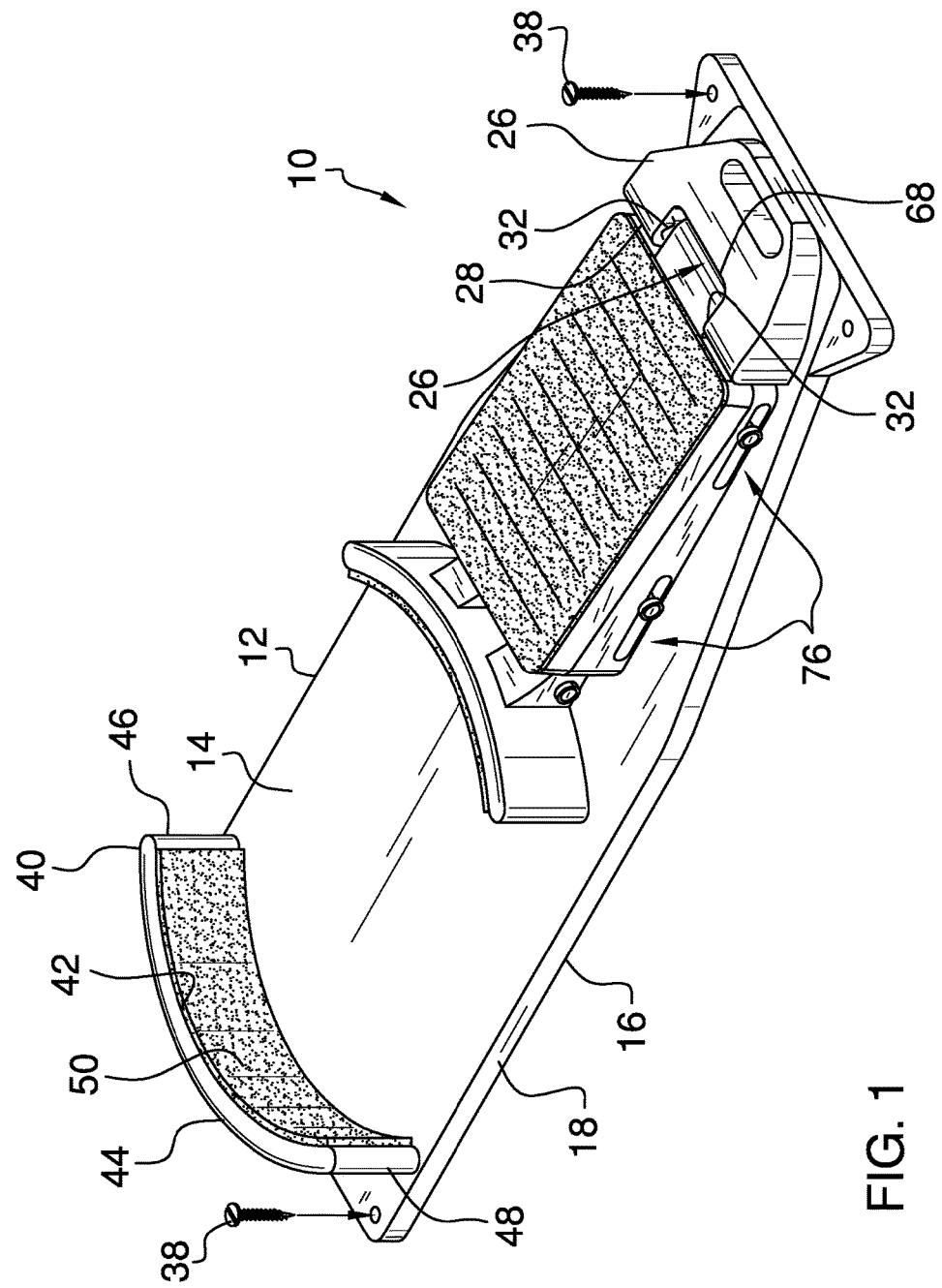
FIG. 1 is a perspective view of a container restraint assembly according to an embodiment of the disclosure.
Figure 2:
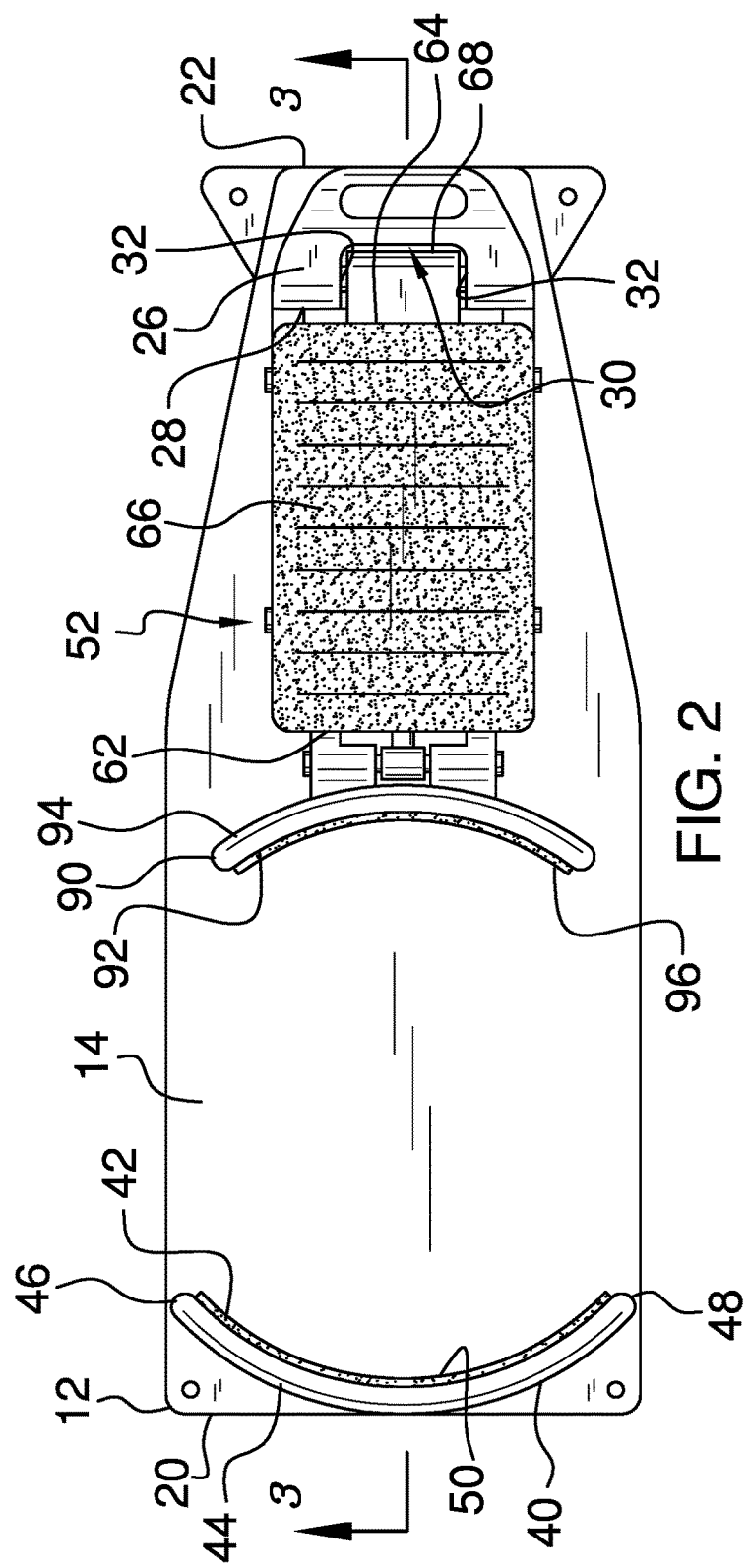
FIG. 2 is a top view of an embodiment of the disclosure.
Figure 3:
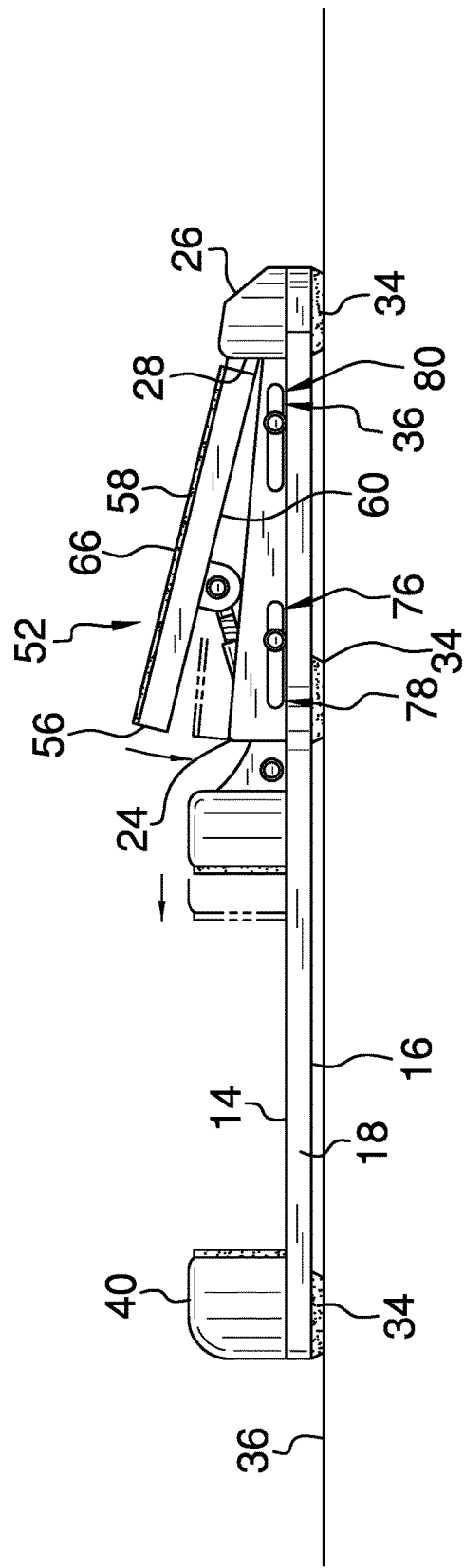
FIG. 3 is a left side view of an embodiment of the disclosure.
Figure 4:
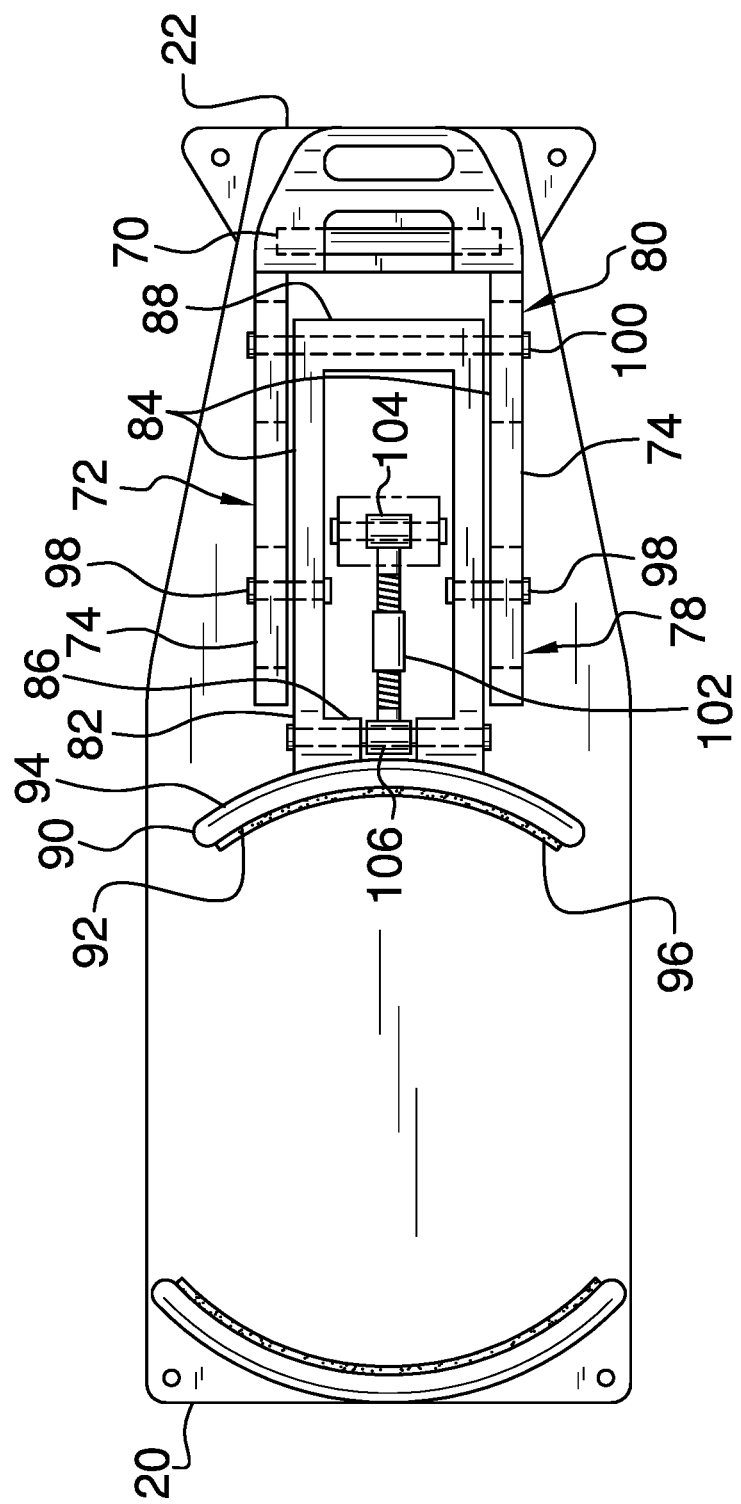
FIG. 4 is a top phantom view of an embodiment of the disclosure.
Figure 5:
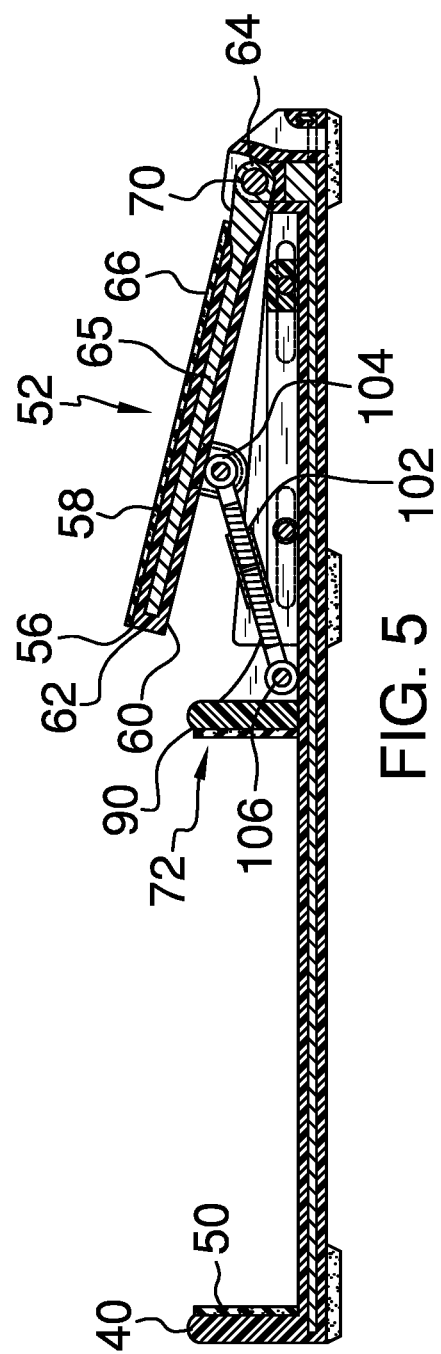
FIG. 5 is a cross sectional view taken along line 5-5 of FIG. 2 of an embodiment of the disclosure.
Figure 6:
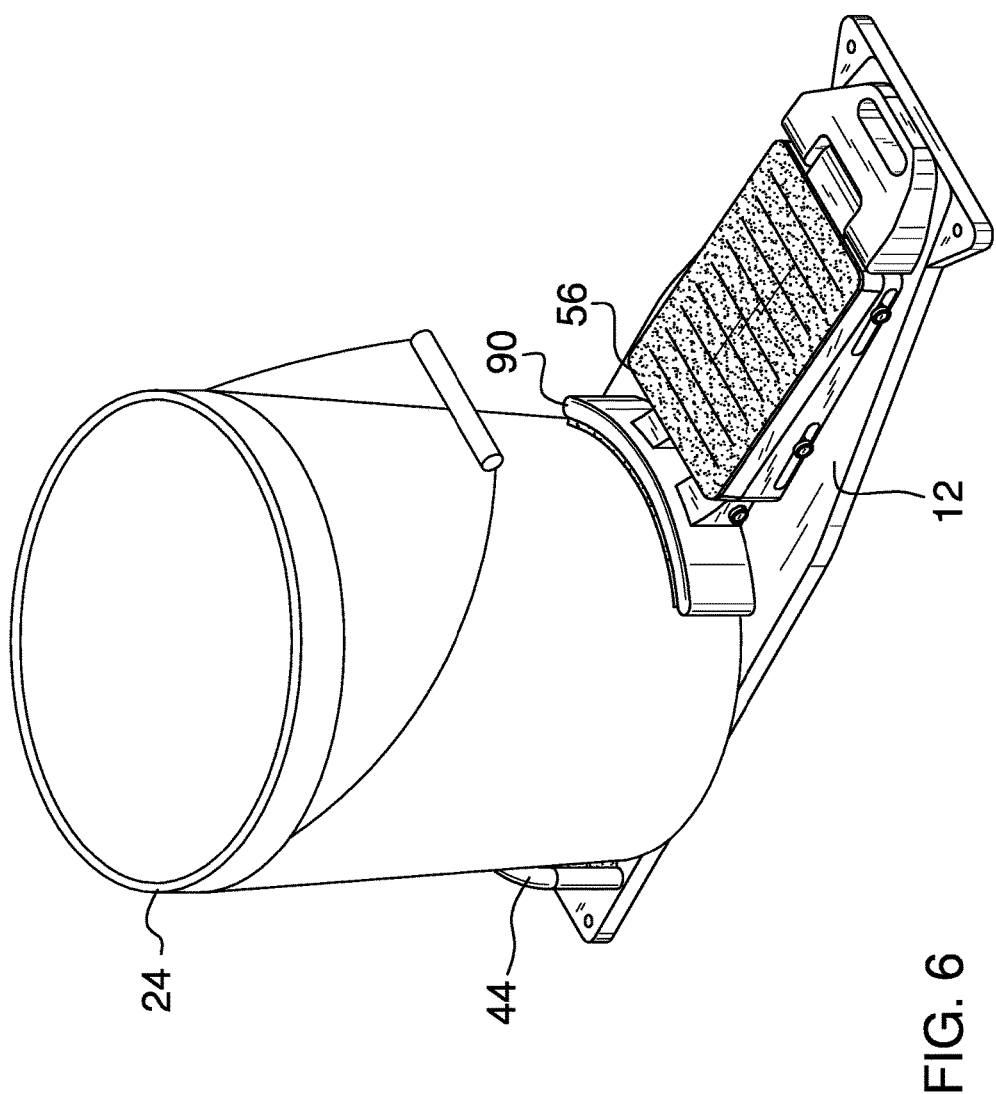
FIG. 6 is a perspective in-use view of an embodiment of the disclosure.

With reference now to the drawings, and in particular to FIGS. 1 through 6 thereof, a new restraint device embodying the principles and concepts of an embodiment of the disclosure and generally designated by the reference numeral 10 will be described.

As best illustrated in FIGS. 1 through 6, the container restraint assembly 10 generally comprises a base 12 has a top side 14, a bottom side 16 and a peripheral edge 18 extending between the top side 14 and the bottom side 16. The peripheral edge 18 has a front side 20 and a back side 22 and the base 12 is elongated between the front side 20 and the back side 22. The top side 14 may have a container 24 positioned thereon and the container 24 may comprise a five gallon bucket or other similar container that has a substantially cylindrical shape.

The base 12 has a handle portion 26 extending upwardly from the top side 14. The handle portion 26 is positioned adjacent to the back side 22 wherein the handle portion 26 may be gripped thereby facilitating the base 12 to be carried. The handle portion 26 has a forward surface 28 and the forward surface 28 has a groove 30 extending therein toward the back side 22. The groove 30 has a pair of lateral bounding surfaces 32. A plurality of feet 34 is provided and each of the feet 34 is coupled to the bottom side 16. Thus, the feet 34 may abut a support surface 36 such that the base 12 is supported above the support surface 36. A plurality of screws 38 may be extended through the base 12 to engage the support surface 36 thereby retaining the base 12 on the support surface 36.

A stop 40 is provided that has a front surface 42, a back surface 44, a first end 46 and a second end 48 and the stop 40 is coupled to the base 12. The stop 40 extends upwardly from the top side 14 and the stop 40 is positioned proximate the front side 20. Each of the front surface 42 and the back surface 44 is concavely arcuate between the first end 46 and the second end 48 wherein the stop 40 may engage the container 24. A first pad 50 is attached to the stop 40 and the first pad 50 is positioned on the front surface 42 such that the first pad 50 may abut the container 24.

A retainer 52 is movably coupled to the base 12 wherein the retainer 52 may be manipulated by a user 54. The retainer 52 is positionable in an engaging position to compress the container 24 against the stop 40. Thus, contents of the container 24 may be mixed without the container 24 tipping over. The retainer 52 is positionable in a releasing position to allow the container 24 to be removed from the base 12.

The retainer 52 comprises a pedal 56 that has a top side 58, a bottom side 60, a first end 62 and a second end 64. The pedal 56 may be comprised of a rigid material. Alternatively, the pedal 56 may have a central core 65 that is comprised of a rigid material. A grip 66 is coupled to the top side 58 and the grip 66 completely covers the top side 58. The grip 66 may be comprised of a resiliently compressible material and the grip 66 may be stepped on by the user 54, thereby enhancing the user's 54 grip on the pedal 56. The second end 64 has a tab 68 that is coupled to and extends away from the second end 64. The tab 68 is positioned within the groove 30 in the handle portion 26. A pedal pin 70 extends laterally through the tab 68 and engages each of the lateral bounding surfaces 32 of the groove 30 such that the pedal 56 is hingedly coupled to the base 12.

An urging unit 72 is movably coupled to the top side 14 of the base 12. The urging unit 72 is movably coupled to the pedal 56 such that the urging unit 72 urges the container 24 against the stop 40 when the user 54 steps on the pedal 56. The urging unit 72 comprises a pair of tracks 74 that are each coupled to and extend upwardly from the top side 14 and each of the tracks 74 extends forwardly from the handle portion 26. The tracks 74 are spaced apart from each other such that each of the tracks 74 is positioned on opposite sides of the pedal 56. Each of the tracks 74 has a pair of slots 76 extending laterally therethrough and the slots 76 in each of the tracks are spaced apart from each other. The pair of slots 76 in each of the tracks 74 includes a front slot 78 and a rear slot 80.

A bracket 82 is provided that has a pair of longitudinal arms 84 coupled to and extending between each of a front lateral arm 86 and a back lateral arm 88. The longitudinal arms 84 are spaced apart from each other such that the bracket 82 has a rectangular shape. The bracket 82 is slidably positioned between the tracks 74. An engaging member 90 is provided that has a forward surface 92 and a rearward surface 94 and the rearward surface 94 is attached to the front lateral arm 86. Each of the forward surface 92 and the rearward surface 94 is concavely arcuate thereby facilitating the engaging member 90 to engage the container 24. A second pad 96 is attached to the forward surface 92 of the engaging member 90 to abut the container 24. Each of the first pad 50 and the second pad 96 enhances the container 24 being retained between the stop 40 and the engaging member 90.

A first set of pins 98 is provided and each of the first set of pins 98 extends through an associated one of the longitudinal arms 84 and engages the front slot 78 in each of the tracks 74. A second pin 100 extends through the back lateral arm 88 and engages the rear slot 80 in each of the tracks 74. Each of the first set of pins 98 and the second pin 100 slides freely within the associated front slot 78 and the rear slot 80 such that the bracket 82 is slidably coupled to the tracks 74.

A piston 102 is provided that has a first end 104 and a second end 106. The first end 104 of the piston 102 is rotatably coupled to the bottom side 60 of the pedal 56 and the second end 106 is rotatably coupled to the front lateral arm 86. The first end 104 of the piston is removable from the bottom side 60 of the pedal 56 to facilitate cleaning beneath the pedal 56. The piston 102 urges the bracket 82 forwardly on the base 12 when the pedal 56 is urged downwardly. Thus, the engaging member 90 compresses the container 24 against the stop 40. The piston 102 has an adjustable length thereby facilitating the piston 102 to adjust a travel distance of the bracket 82 and the piston 102 biases the pedal 56 upwardly away from the base 12. The piston 102 is adjustable to accommodate containers 24 having a variety of diameters.

In use, the base 12 is positioned on the support surface 36. The length of the piston 102 is adjusted to accommodate the diameter of the container 24. The user 54 steps on the pedal 56 thereby facilitating the retainer 52 to restrain the container 24 on the base 12. The user 54 mixes contents of the container 24. The user 54 steps off of the pedal 56 and removes the container 24 from the base 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A container restraint assembly configured to restrain a container while contents of the container are mixed, said assembly comprising:
    a base being configured to have a container positioned thereon;
    a stop being coupled to said base wherein said stop is configured to engage the container;
    a retainer being movably coupled to said base wherein said retainer is configured to be manipulated by a user, said retainer being positionable in an engaging position wherein said retainer is configured to compress the container against said stop thereby facilitating contents of the container to be mixed without the container tipping over, said retainer being positionable in a releasing position wherein said retainer is configured to allow the container to be removed from said base; and
    a bracket having a pair of longitudinal arms coupled to and extending between each of a front lateral arm and a back lateral arm, said longitudinal arms being spaced apart from each other such that said bracket has a rectangular shape, said bracket being slidably positioned between said tracks.

2. The assembly according to claim 1, wherein said base has a top side, a bottom side and a peripheral edge extending between said top side and said bottom side, said peripheral edge having a front side and a back side, said base being elongated between said front side and said back side, said base having a handle portion extending upwardly from said top side, said handle portion being positioned adjacent to said back side wherein said handle portion is configured to be gripped thereby facilitating said base to be carried.

3. The assembly according to claim 2, wherein said handle portion has a forward surface, said forward surface having a groove extending therein toward said back side, said groove having a pair of lateral bounding surfaces.

4. The assembly according to claim 2, further comprising a plurality of feet, each of said feet being coupled to said bottom side wherein said feet are configured to abut a support surface such that said base is supported above the support surface.

5. The assembly according to claim 1, wherein:
    said base has a top side and a front side; and
    said stop has a front surface, a back surface, a first end and a second end, said stop extending upwardly from said top side, said stop being positioned proximate said front side, each of said front surface and said back surface being concavely arcuate between said first end and said second end.

6. The assembly according to claim 5, further comprising a first pad being attached to said stop, said first pad being positioned on said front surface such that said first pad is configured to abut the container.

7. A container restraint assembly configured to restrain a container while contents of the container are mixed, said assembly comprising:
    a base being configured to have a container positioned thereon;
    a stop being coupled to said base wherein said stop is configured to engage the container;
    a retainer being movably coupled to said base wherein said retainer is configured to be manipulated by a user, said retainer being positionable in an engaging position wherein said retainer is configured to compress the container against said stop thereby facilitating contents of the container to be mixed without the container tipping over, said retainer being positionable in a releasing position wherein said retainer is configured to allow the container to be removed from said base;

said base has a handle portion, said handle portion having a groove; and said retainer comprises a pedal having a top side, a bottom side, a first end and a second end, said second end having a tab being coupled to and extending away from said second end, said tab being positioned within said groove in said handle portion, said top side being configured to be stepped on by the user.

8. The assembly according to claim 7, further comprising:
said groove having a pair of lateral bounding surfaces; and
a pedal pin extending laterally through said tab and engaging each of said lateral bounding surfaces of said groove such that said pedal is hingedly coupled to said base.

9. The assembly according to claim 1, further comprising:
said base having a top side;
a pedal; and
an urging unit being movably coupled to said top side of said base, said urging unit being movably coupled to said pedal such that said urging unit is configured to urge the container against said stop when the user steps on said pedal.

10. The assembly according to claim 9, wherein:
said base has a handle portion; and
said urging unit comprises a pair of tracks, each of said tracks being coupled to and extending upwardly from said top side, each of said tracks extending forwardly from said handle portion, said tracks being spaced apart from each other such that each of said tracks each of said tracks is positioned on opposite sides of said pedal.

11. The assembly according to claim 10, wherein each of said tracks has a pair of slots extending laterally therethrough, said slots in each of said tracks being spaced apart from each other, said pair of slots in each of said tracks including a front slot and a rear slot.

12. The assembly according to claim 1, further comprising:
an engaging member having a forward surface and a rearward surface, said rearward surface being attached to said front lateral arm, each of said forward surface and said rearward surface being concavely arcuate such that said engaging member is configured to engage the container; and
a second pad being attached to said forward surface of said engaging member wherein said second pad is configured to abut the container.

13. The assembly according to claim 1, wherein:
a pair of tracks, each of said tracks having a front slot and a rear slot;
a first set of pins, each of said first set of pins extending through an associated one of said longitudinal arms and engaging said front slot in each of said tracks; and
a second pin extending through said back lateral arm and engaging said rear slot in each of said tracks, each of said first set of pins and said second pin sliding freely within said front slot and said rear slot such that said bracket is slidably coupled to said tracks.

14. The assembly according to claim 1, further comprising:
a pedal having a bottom side;
a bracket having a front lateral arm;
an engaging member; and a piston having a first end and a second end, said first end of said piston being rotatably coupled to said bottom side of said pedal, said second end being rotatably coupled to said front lateral arm, said piston urging said bracket forwardly on said base when said pedal is urged downwardly wherein said engaging member is configured to compress the container against said stop.

15. The assembly according to claim 14, wherein said piston has an adjustable length thereby facilitating said piston to adjust a travel distance of said bracket, said piston biasing said pedal upwardly away from said base.

16. A container restraint assembly configured to restrain a container while contents of the container are mixed, said assembly comprising:

a base having a top side, a bottom side and a peripheral edge extending between said top side and said bottom side, said peripheral edge having a front side and a back side, said base being elongated between said front side and said back side, said top side being configured to have a container positioned thereon, said base having a handle portion extending upwardly from said top side, said handle portion being positioned adjacent to said back side wherein said handle portion is configured to be gripped thereby facilitating said base to be carried, said handle portion having a forward surface, said forward surface having a groove extending therein toward said back side, said groove having a pair of lateral bounding surfaces;

a plurality of feet, each of said feet being coupled to said bottom side wherein said feet are configured to abut a support surface such that said base is supported above the support surface;

a stop having a front surface, a back surface, a first end and a second end, said stop being coupled to said base, said stop extending upwardly from said top side, said stop being positioned proximate said front side, each of said front surface and said back surface being concavely arcuate between said first end and said second end wherein said stop is configured to engage the container;

a first pad being attached to said stop, said first pad being positioned on said front surface such that said first pad is configured to abut the container; and a retainer being movably coupled to said base wherein said retainer is configured to be manipulated by a user, said retainer being positionable in an engaging position wherein said retainer is configured to compress the container against said stop thereby facilitating contents of the container to be mixed without the container tipping over, said retainer being positionable in a releasing position wherein said retainer is configured to allow the container to be removed from said base, said retainer comprising:

a pedal having a top side, a bottom side, a first end and a second end, said second end having a tab being coupled to and extending away from said second end, said tab being positioned within said groove in said handle portion, said top side being configured to be stepped on by the user, a pedal pin extending laterally through said tab and engaging each of said lateral bounding surfaces of said groove such that said pedal is hingedly coupled to said base, and an urging unit being movably coupled to said top side of said base, said urging unit being movably coupled to said pedal such that said urging unit is configured to urge the container against said stop when the user steps on said pedal, said urging unit comprising:

a pair of tracks, each of said tracks being coupled to and extending upwardly from said top side, each of said tracks extending forwardly from said handle portion, said tracks being spaced apart from each other such that each of said tracks is positioned on opposite sides of said pedal, each of said tracks having a pair of slots extending laterally therethrough, said slots in each of said tracks being spaced apart from each other, said pair of slots in each of said tracks including a front slot and a rear slot, a bracket having a pair of longitudinal arms coupled to and extending between each of a front lateral arm and a back lateral arm, said longitudinal arms being spaced apart from each other such that said bracket has a rectangular shape, said bracket being slidably positioned between said tracks, a engaging member having a forward surface and a rearward surface, said rearward surface being attached to said front lateral arm, each of said forward surface and said rearward surface being concavely arcuate such that said engaging member is configured to engage the container, a second pad being attached to said forward surface of said engaging member wherein said second pad is configured to abut the container, a first set of pins, each of said first set of pins extending through an associated one of said longitudinal arms and engaging said front slot in each of said tracks, a second pin extending through said back lateral arm and engaging said rear slot in each of said tracks, each of said first set of pins and said second pin sliding freely within said front slot and said rear slot such that said bracket is slidably coupled to said tracks, and a piston having a first end and a second end, said first end of said piston being rotatably coupled to said bottom side of said pedal, said second end being rotatably coupled to said front lateral arm, said piston urging said bracket forwardly on said base when said pedal is urged downwardly wherein said engaging member is configured to compress the container against said stop, said piston having an adjustable length thereby facilitating said piston to adjust a travel distance of said bracket, said piston biasing said pedal upwardly away from said base.

* * * * *